M. C. NAY.
Sand-Guard for Carriage-Axles.

No. 204,164. Patented May 28, 1878.

Witnesses,
W. J. Cambridge
J. E. Cambridge

Inventor,
Moses C. Nay,
Per Teschemacher & Stearns,
Attorneys.

UNITED STATES PATENT OFFICE.

MOSES C. NAY, OF BOSTON, MASSACHUSETTS.

IMPROVEMENT IN SAND-GUARDS FOR CARRIAGE-AXLES.

Specification forming part of Letters Patent No. 204,164, dated May 28, 1878; application filed January 2, 1877.

*To all whom it may concern:*

Be it known that I, MOSES C. NAY, of Boston, in the county of Suffolk and State of Massachusetts, have invented certain Improvements in Axles and Axle-Boxes, of which the following is a full, clear, and exact description, reference being had to the accompanying drawings, making part of this specification, in which—

Figure 1:
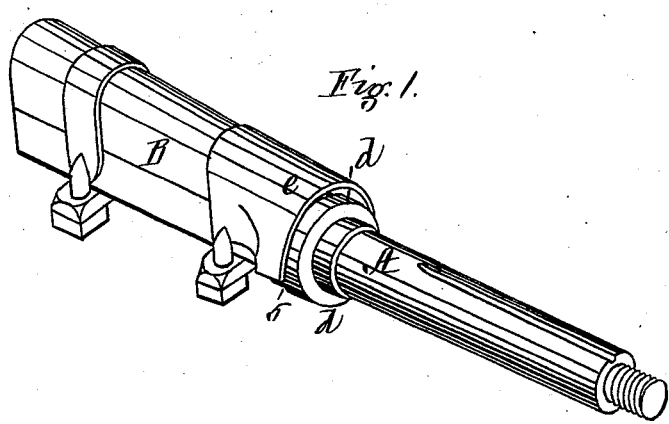
Figure 2:
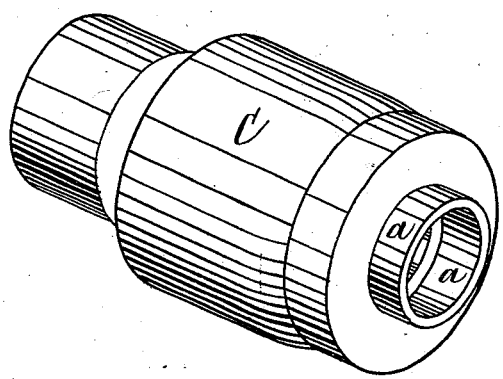
Figure 3:
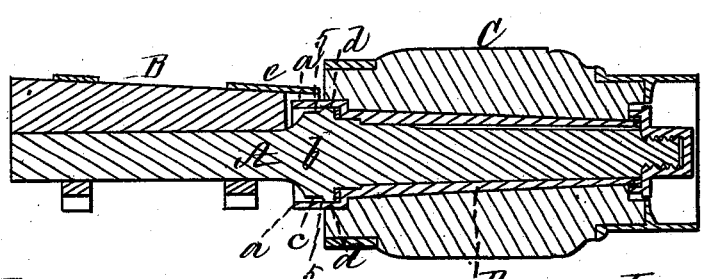

Figure 1 is a perspective view of a carriage axle and clip constructed in accordance with my invention. Fig. 2 is a perspective view of a carriage-hub with my improved axle-box applied thereto. Fig. 3 is a central longitudinal section through the parts when fitted together.

The object of my present invention is to prevent the entrance of sand, dirt, and other extraneous matter into the axle-box, and thereby avoid the heating and expansion of the parts incident to the ordinary construction of axles and axle-boxes.

Though it is not claimed that the elements hereinafter specified are in themselves novel, their combination and arrangement effectually overcome the difficulties recited, and render the frequent oiling of parts unnecessary.

To enable others skilled in the art to understand and use my invention, I will proceed to describe the manner in which I have carried it out.

In the said drawings, A represents the axle; B, the clip; C, the hub, and D the axle-box, the inner portion $a$ of which, formed in one and the same piece therewith, projects beyond the hub, and extends over the collar $b$, which is of more than ordinary width, and is turned down so as to reduce the diameter of the portion $c$ next the clip, thus forming an annular shoulder, 5, the portion $d$ of the collar being of the same diameter as the interior of the inner end of the axle-box, and fitting into and bearing on that portion thereof supported by and within the hub, while the portion $c$ of the collar is of less diameter than the projecting portion or extension $a$ of the axle-box, and is simply covered thereby without bearing thereon; and as this extension of the axle-box is not supported by the hub in a manner similar to the other portion of the axle-box, it is not liable to be split or broken, as would be the case if these parts were of the same diameter. The outer end $e$ of the clip is extended and made flaring, so as to project over the extension of the axle-box.

From the foregoing construction it will be seen that the extension $a$ of the axle-box covers over and protects the collar, and excludes the dirt, &c., while the shoulder 5 affords an additional barrier and prevents the entrance into the axle-box of any dirt which may work into the outer end of the extension $a$, and the extension $e$ of the clip serves as a guard to prevent the dirt being thrown on the extension $a$ of the axle-box.

What I claim as my invention, and desire to secure by Letters Patent, is—

The combination of the axle A, having wide collar $b$, and turned-down portion $c$, forming shoulders 5 $d$, axle-box D, and extension $a$, formed in one piece, clip B, having the outer extended flaring end $e$ projecting over extension end of axle-box, and the hub C, the several parts constructed and relatively arranged with each other, substantially in the manner herein shown and described, and for the purpose specified.

Witness my hand this 26th day of December, A. D. 1876.

MOSES C. NAY.

In presence of—
P. E. TESCHEMACHER,
W. J. CAMBRIDGE.